United States Patent
Mestha et al.

(10) Patent No.: US 8,023,156 B2
(45) Date of Patent: *Sep. 20, 2011

(54) IMAGE OUTPUT COLOR MANAGEMENT SYSTEM AND METHOD

(75) Inventors: Lalit Keshav Mestha, Fairport, NY (US); Yao Rong Wang, Webster, NY (US); Zhigang Fan, Webster, NY (US); Alvaro Enrique Gil, Rochester, NY (US); Matthew F. Hoffmann, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 1066 days.

This patent is subject to a terminal disclaimer.

(21) Appl. No.: 11/789,091

(22) Filed: Apr. 23, 2007

(65) Prior Publication Data

US 2008/0252931 A1    Oct. 16, 2008

Related U.S. Application Data (60) Provisional application No. 60/922,607, filed on Apr. 10, 2007.

(51) Int. Cl.
*G06K 15/00* (2006.01)
(52) U.S. Cl. ........ 358/3.23; 358/1.9; 382/162; 382/163; 382/164; 382/165; 382/166; 382/167
(58) Field of Classification Search .............. 358/1.9, 358/3.23; 382/162–167
See application file for complete search history.

(56) References Cited

U.S. PATENT DOCUMENTS

| | | | |
|---|---|---|---|
| 7,177,466 B1 * | 2/2007 | Bernard et al. | 382/167 |
| 2003/0023148 A1 * | 1/2003 | Lorenz et al. | 600/300 |
| 2003/0103222 A1 * | 6/2003 | Kato et al. | 358/1.9 |
| 2006/0197966 A1 * | 9/2006 | Viturro et al. | 358/1.9 |

OTHER PUBLICATIONS

Dianat et al., "Dynamic Optimization Algorithm for Generating Inverse Printer Maps With Reduced Measurements", IEEE publication, by Rochester Institute of Technology Rochester, NY 14623, Xerox Corporation, dated May 14-19, 2006.

Xia et al., "End-To-End Color Printer Calibration by Total Least Squares Regression", IEEE publication, Department of Electrical Engineering and Center for Electronic Imaging Systems, Rochester, NY 14627, Xerox Corporation, dated 1999.

Bruce Lindbloom, "RGB Working Space Information," 10 pages, dated Oct. 10, 2003; http://www.brucelindbloom.com/index. html?WorkingSpaceInfo.html.

"International Color Consortium," Specification ICC.1:2004-10— Profile version 4.2.0.0 describing image technology, architecture, profile format and structure, ICC 2004.

U.S. Appl. No. 11/507,405, filed Aug. 21, 2006, Hancock et al.

(Continued)

*Primary Examiner* — Benny Tieu
*Assistant Examiner* — Qian Yang
(74) *Attorney, Agent, or Firm* — Fay Sharpe LLP (57) ABSTRACT

Disclosed is an image color management system and method for controlling an image output device. The method for controlling the image output device comprises generating an image output device profile LUT (look-up-table) characterizing the color profile of the image output device for a plurality of drift states associated with the image output device; generating a set of basis vectors representing the LUT; storing the set of basis vectors in an image output device controller; and generating an image output device active profile associated with a current drift state of the image output device to convert image color data for display or printing by the image output device, wherein the image output device active profile is generated from the set of basis vectors.

20 Claims, 6 Drawing Sheets

OTHER PUBLICATIONS

U.S. Appl. No. 11/507,406, filed Aug. 21, 2006, Gil et al.
U.S. Appl. No. 11/636,747, filed Dec. 11, 2006, Mestha et al.
U.S. Appl. No. 11/636,841, filed Dec. 11, 2006, Wang et al.
U.S. Appl. No. 11/314,104, filed Dec. 21, 2005, Fan et al.
U.S. Appl. No. 11/314,670, filed Dec. 21, 2005, Fan et al.
U.S. Appl. No. 11/313,018, filed Dec. 20, 2005, Mizes et al.

* cited by examiner

FIG. 6

IMAGE OUTPUT COLOR MANAGEMENT SYSTEM AND METHOD

This application claims priority of U.S. Provisional Patent Application Ser. No. 60/922,607 filed on Apr. 10, 2007 and entitled "AN IMAGE OUTPUT COLOR MANAGEMENT SYSTEM AND METHOD," by Mestha et al., the entirety of which is incorporated herein by reference.

CROSS REFERENCE TO RELATED PATENTS AND APPLICATIONS

U.S. patent application Ser. No. 11/507,405, entitled: "SYSTEM AND METHOD FOR AUTOMATED SPOT COLOR EDITOR", by Joseph D. Hancock et al., filed Aug. 21, 2006; and U.S. patent application Ser. No. 11/507,406, entitled: "SPOT COLOR CONTROLS AND METHOD", by Gil et al., filed Aug. 21, 2006; and are hereby totally incorporated by reference.

BACKGROUND

This disclosure relates to color image output systems. Specifically, this disclosure relates to a system and method of controlling an image output device to produce a consistent spectrum of colors and color separations.

To meet customer demands, image output devices such as a printer or display need to produce a consistent spectrum of colors over time. For example, customers want a printing system to produce a particular colored document consistently from day to day, or print job to print job.

To control the color rendering consistency of a printing device, the printing device is typically characterized and calibrated prior to being shipped to a customer. The characterization and calibration process produces a set of LUTs (look-up tables) which correlate a standardized set of target colors with the appropriate device dependent color space values necessary to produce the target colors with the printing device. For example, a Pantone® color spectrum may be utilized as a color target reference and the LUTs produced by the characterization and calibration process are device dependent CMYK color space representations of the Pantone® target colors. This characterization and calibration process is generally referred to as profiling a device or printer.

To accomplish the profiling of a printing device, a spectrophotometer or other image sensing device is used to measure the colorimetric properties of the produced images. These measured colorimetric properties provide an objective basis of comparison to the reference target color set and provide the necessary feedback to iteratively generate accurate device dependent LUTs. Stated another way, device independent CMYK values are correlated to the reference target color set, and the LUT correlates the reference target color set device independent CMYK values to the device dependent CMYK values.

Notably, the device profiling method discussed above can also be applied to a display where an image sensing device is approximately located to the display for colorimetric measurements of the displayed image. In addition, multiple LUTs may be generated for an image output device to account for multiple media types and/or half tone screens.

This disclosure provides a system and method of calibrating an image output device subsequent to the initial factory profiling process described above. The system and method disclosed accounts for image output device drift such as printer drift. For purposes of this disclosure, printer drift generally refers to an overall change in the color rendering of a printing device relative to the initial factory device dependent CMYK LUTs generated during the color profiling process.

INCORPORATION BY REFERENCE

The following patents/applications and publications, the disclosures of each being totally incorporated herein by reference are mentioned:

U.S. patent Ser. No. 11/636,747, entitled "METHOD AND SYSTEM FOR IDENTIFYING OPTIMAL MEDIA FOR CALIBRATION AND CONTROL", by Mestha et al., filed Dec. 11, 2006;

U.S. patent Ser. No. 11/636,841, entitled "OPTIMAL TEST PATCH SELECTION FOR MULTI-MEDIA PRINTING SYSTEMS USING LOW RANK APPROXIMATION", by Wang et al., filed Dec. 11, 2006;

U.S. patent Ser. No. 11/314,104, entitled "SYSTEM AND METHOD FOR IMAGE BASED CONTROL USING IN LINE SENSORS", by Zingang Fan et al., filed Dec. 21, 2005;

U.S. patent Ser. No. 11/314,670, entitled "OPTIMAL TEST PATCH LEVEL SELECTION FOR SYSTEMS THAT ARE MODELED USING LOW RANK EIGEN FUNCTIONS, WITH APPLICATIONS TO FEEDBACK CONTROLS", by Fan et al., filed Dec. 21, 2005;

U.S. patent Ser. No. 11/313,018, entitled "METHODS AND APPARATUSES FOR CONTROLLING PRINT DENSITY", by Mizes et al., filed Dec. 20, 2005;

"DYNAMIC OPTIMIZATION ALGORITHM FOR GENERATING INVERSE PRINTER MAPS WITH REDUCED MEASUREMENTS", IEEE publication, by Dianat et al., Rochester Institute of Technology Rochester, N.Y. 14623, Xerox Corporation, dated May 14-19, 2006;

"END-TO-END COLOR PRINTER CALIBRATION BY TOTAL LEAST SQUARES REGRESSION", IEEE publication, by Xia et al., Department of Electrical Engineering and Center for Electronic Imaging Systems, Rochester, N.Y. 14627, Xerox Corporation, dated 1999;

"A PRINTER MODEL FOR DOT-ON-DOT HALFTONE SCREENS", SPIE publication, by Bares et al., vol. 2413, pages 356-364, dated April 1995;

"RGB Working Space Information", by Bruce Lindbloom; 10 pages, dated Oct. 10, 2003; Internet Address: http://www.brucelindbloom.com/index.html?WorkingSpaceInfo.html; and "International Color Consortium," Specification ICC.1: 2004-10—Profile version 4.2.0.0 describing image technology, architecture, profile format and structure; ICC 2004, 113 pages.

BRIEF DESCRIPTION

In one aspect of the present disclosure, a method for controlling an image output device is disclosed. The method for controlling an image output device comprises generating an image output device profile LUT (look-up-table) characterizing the color profile of the image output device for a plurality of drift states associated with the image output device; generating a set of basis vectors representing the LUT; storing the set of basis vectors in an image output device controller; and generating an image output device active profile associated with a current drift state of the image output device to convert image color data for display or printing by the image output device, wherein the image output device active profile is generated from the set of basis vectors.

In another aspect of this disclosure, a method for controlling an image output device is disclosed. The method comprises generating an image output device profile LUT characterizing the color profile of the image output device for a plurality of drift states associated with the image output device; generating a set of Principal component basis vectors representing the LUT, where $x=\bar{x}+u\alpha$ and x represents the image output device profile LUT, $\bar{x}$ represents the mean value of x, u represents the eigenvector matrix, and $\alpha$ represents the column vector coefficients; determining a minimal target color set for measurement by an image sensing device; outputting the target color set to the image sensing device to determine the corresponding device dependent color space representations of the target color set; using a least square regression technique, determining the coefficient vector $\alpha$ from the target color set device dependent color space representation of the target color set; and generating the inverse image output device profile LUT x according to the equation $x=\bar{x}+u\alpha$.

In another aspect of this disclosure, an image output device color control system is disclosed. The image output device color control system comprises an image output device comprising an input configured to receive image data for display or printing by the image output device; an in-line colorimetric measurement device; and a controller operatively connected to the image output device, image output terminal input and in-line colorimetric measurement device. The controller is configured to receive device independent image input data and map the device independent input data to device dependent input data for display or printing by the image output device, wherein the controller comprises a controller-usable data carrier storing instructions that, when executed by the controller cause the controller to perform a method. The method comprises (a) accessing a set of Principal basis vectors representing a color profile LUT associated with the image output device, the LUT characterizing the color profile of the image output device for a plurality of drift states; (b) determining a target color set based on the set of Principal basis vectors for measurement by the in-line colorimetric measurement device and outputting the associated device dependant color space representation of the target color set to the image output device; (c) receiving colorimetric data from the in-line colorimetric measurement device for the target color set, where the colorimetric data is a device independent three dimensional color space representation of the target color set; (d) calculating the coefficient vector $\alpha$ of the basis vector using a least square regression technique; and (e) generating a device dependent inverse image output device profile LUT based on the coefficient vector $\alpha$ according to the equation $x=\bar{x}+u\alpha$, where x represents the device dependent image output device profile LUT, $\bar{x}$ represents the mean value of x, and u represents the eigenvector matrix as defined by the said Principal basis vectors.

DETAILED DESCRIPTION

As briefly discussed in the background section, this disclosure relates to the updating of color space profile LUTs. Specifically, this disclosure describes a method and system for generating and updating three-dimensional LUTs using Principal components. The system and method is especially useful at a customer site or in the field after the initial commission of a printing system.

Figure 1:
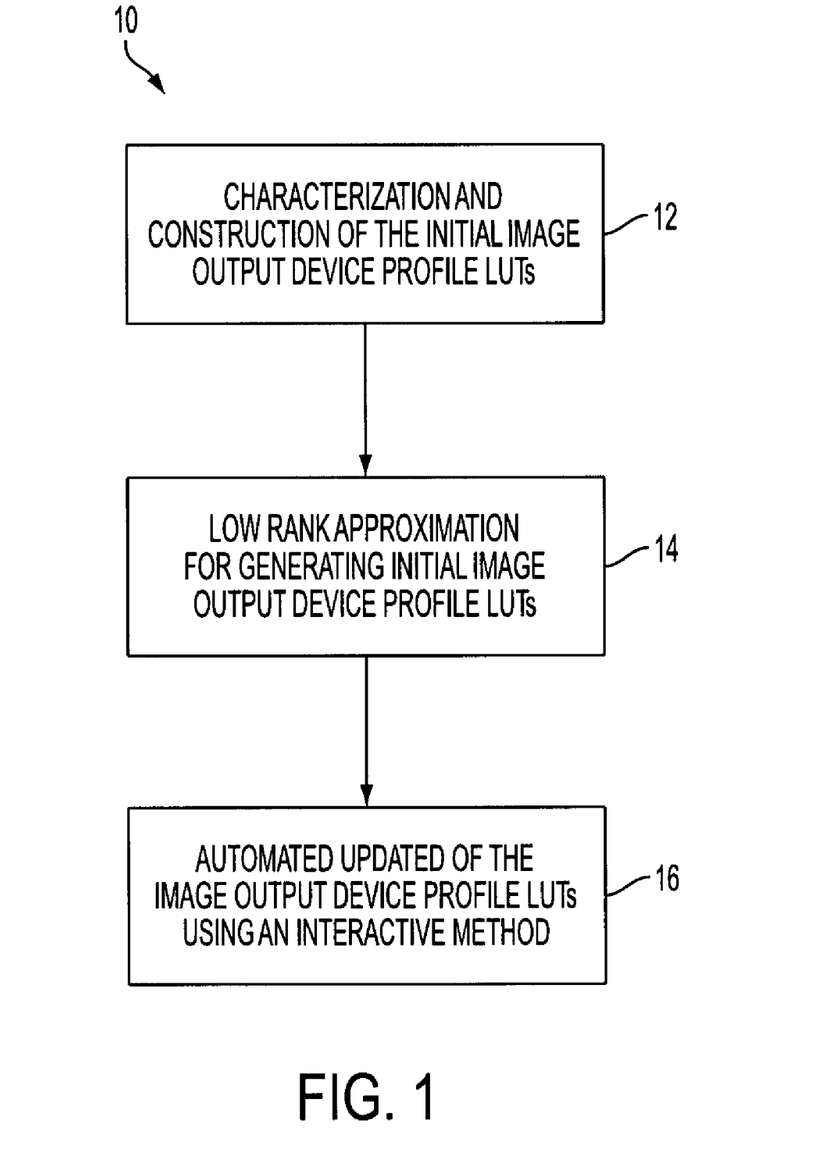
FIG. 1 illustrates a color management process according to an exemplary embodiment of this disclosure.

With reference to FIG. 1, illustrated is a color management system 10 block diagram showing the substantive processes of an exemplary embodiment of this disclosure. The color management system includes a series of three processes which are as follows:

(1) characterization and construction of the initial profile LUTs for multiple media and multiple halftone screens using an iterative method 12;

(2) low rank approximation of the in-factory profile LUTs (i.e. expressing the in-factory profile LUTs in terms of Principal component basis vectors) 14; and (3) automated update of the profile LUTs using an iterative method 16 where the measured colors are optimally selected using the Principal basis vectors.

According to one exemplary embodiment of this disclosure, the optimally selected colors are obtained from an optimal (minimal) color selection algorithm as disclosed in U.S. patent Ser. No. 11/636,841, filed Dec. 11, 2006 by Wang et al., entitled "OPTIMAL TEST PATCH SELECTION FOR MULTI-MEDIA PRINTING SYSTEMS USING LOW RANK APPROXIMATION."

The detailed discussion of the disclosed color management system and method which follows is directed to a printing system. However, the color management system and method is equally applicable to other image output devices such as a display.

Process #1: Characterization and Construction of the Initial Image Output Device Profile LUTs 12.

According to this process, components of color profile LUTs are generated for an image output device such as a printer. This inverse mapping process 20 is illustrated in FIG. 2.

Figure 2:
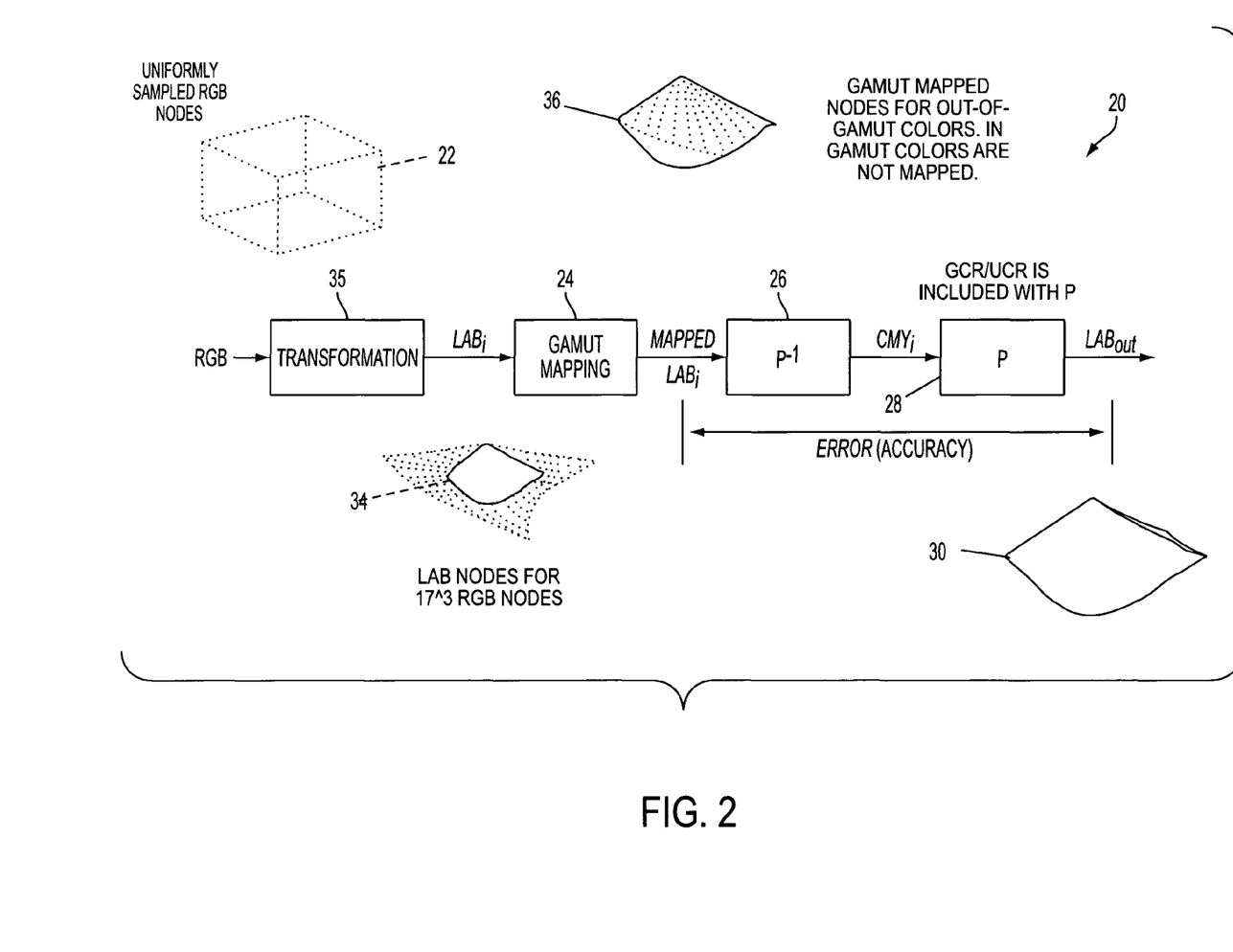
FIG. 2 schematically illustrates a forward and inverse printer process according to an exemplary embodiment of this disclosure.

With reference to FIG. 2, the inverse printer model $P^{-1}$ 26 is a mapping from device independent color space L*a*b* to CMY device dependent space. The CMY values are optionally converted to CMYK using Gray Component Replacement or Under Color Removal (GCR/UCR) algorithms. For example, according to one exemplary embodiment of this disclosure, the GCR/UCR functions are embedded inside the printer, P 28 in FIG. 2. The inverse printer model $P^{-1}$ 26 is defined mathematically as $P^{-1}: L^*a^*b^* \rightarrow CMY$, where input L*a*b* points are on a 3-D grid of size N×N×N having a dynamic range of $0 \leq L \leq 100$; $-127 \leq a \leq 128$ and $-127 \leq b \leq 128$. For the ICC workflow (Reference: International Color Consortium Specification ICC.1:2004-10—Profile version 4.2.0.0 describing image technology, architecture, profile format and structure), these L*a*b* nodes can be generated using a uniformly/non-uniformly sampled RGB colors 22 for the range 0 to 255 each and applying suitable transformation 35 from RGB 30 to L*a*b* 34 and mapping the out-of-gamut colors to the device boundary 36 using printer models. To express these nodes in profile connection space (PCS) of the ICC workflow, a conversion to L*a*b* or XYZ space is required (not shown in FIG. 2). For this purpose, RGB color space is defined for RGB values between 0 to 255 and converted. For example, genRGB or Adobe-RGB etc., (see http://www.brucelindbloom.com/index.html?WorkingSpaceInfo.html) are potential options used while constructing the multi-dimensional profile LUTs. There is correspondence between nodes in RGB space 22 to L*a*b*/XYZ values in Profile Connection Space. Also, there is correspondence between RGB nodes 22 to L*a*b* nodes 34 which are used to construct the printer inverse (i.e., L*a*b* to CMY).

The inverse printer function $P^{-1}$ 26 is obtained for a given printer drift state (called drift state 1) iteratively using spot color control methods and algorithms on each node which map each device-independent color Lab to the device dependent values CMY. This process is illustrated in FIG. 2 where the $Lab_i$ 34 inputs are mapped 24 within the gamut of the printing device. Subsequently, the mapped $Lab_i$ is transformed via the inverse printer model $P^{-1}$ 26 to produce $CMY_i$, and the device dependent $CMY_i$ is further processed by printer model P 28 to produce a $Lab_{out}$ 30 color space representation of the device dependent $CMY_i$ values. The $Lab_{out}$ 30 color space representation provides a means for comparison with the reference input $Lab_i$ to determine and control the accuracy of the inverse printer model $P^{-1}$ transformation. This process is performed in an iterative fashion to achieve the desired accuracy for each nodes, for example less than 3% error. Out of gamut L*a*b* values are mapped 24 to the nearest gamut boundary points to a region in the color space to produce a pleasing color using an appropriate gamut-mapping algorithm 36. By running the spot control algorithm for each node color (each node being defined as spot color), a LUT of size N×N×N from L*a*b*→CMY is produced, where the input L*a*b* is on a uniform grid or at desired points on the grid and the output CMY is unstructured. This inverse map is a necessary part of the profile algorithm.

The inverse printer function is repeated for various drift states, media and half tones. The data obtained from these steps are collected in a data matrix as illustrated in FIG. 3.

Figure 3:
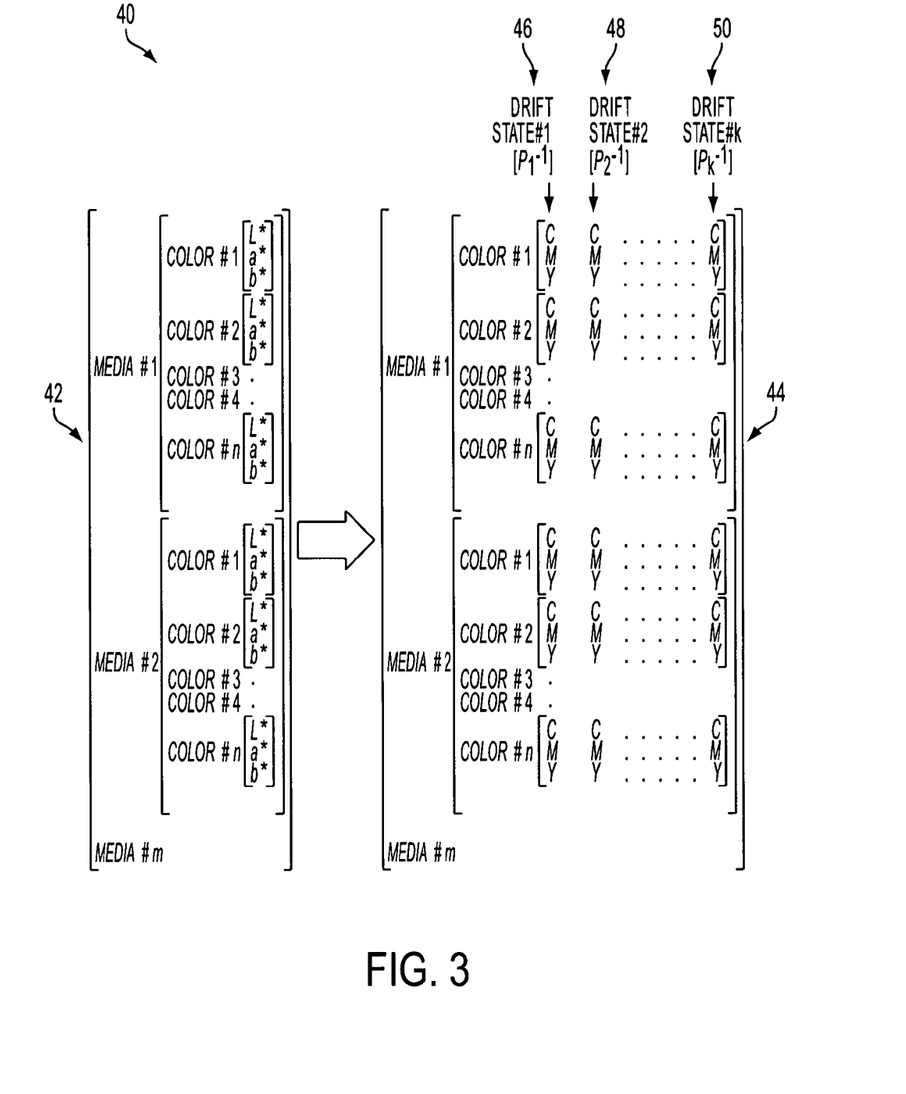
FIG. 3 illustrates a device independent color space to device dependent color space LUT according to an exemplary embodiment of this disclosure.

With reference to FIG. 3, illustrated is a data matrix 40 representing an inverse printer function $P^{-1}$ 26 generated using an iterative process as described with reference to FIG. 2.

The data matrix 40 or LUT includes gamut mapped three dimensional input color space representations 42 of color nodes for different media types which are transformed to a device dependent three dimensional color space representations 44 of each color node corresponding to each media type. Moreover, an independent set of device dependent three dimensional color space representations of each color node is generated for each drift state associated with the printing system. For example, drift state #1 46, drift state #2 48 and drift state k 50, where k represents the total number of printing system drift states quantified for a particular printing system.

Notably, the gamut mapped three dimensional data matrix 40 may take the form of dimensions greater than three. For example, a four dimensional data matrix of CMYK values where the inverse printer function 28 applies GCR/UCR algorithms to transform the $CMY_i$ values to $CMYK_i$ values.

Process #2: Low Rank Approximation for Generating Initial Image Output Device Profile LUTs 14.

Subsequent to generating the inverse printer data matrix 40 illustrated in FIG. 3, the printer data matrix 40 is processed to produce a Principal component representation of the printer data matrix. The Principal component representation of the printer data matrix 40 can be generated where $$P^{-1} = P^{-1}\text{nom} + \text{delta } P^{-1}, \text{ and}$$

delta $P^{-1}$ is expressed in terms of Principal components which are equal to the weighted linear sum of basis vectors. In other words, delta $P^{-1}$ is a relatively small adjustment of the nominal profile $P^{-1}$nom for describing the behavior of the printing system across multiple drift states, color nodes, half tone screens and media types. The $P^{-1}$nom could also be constructed by taking the mean values of each row vector in the data matrix.

Figure 4:
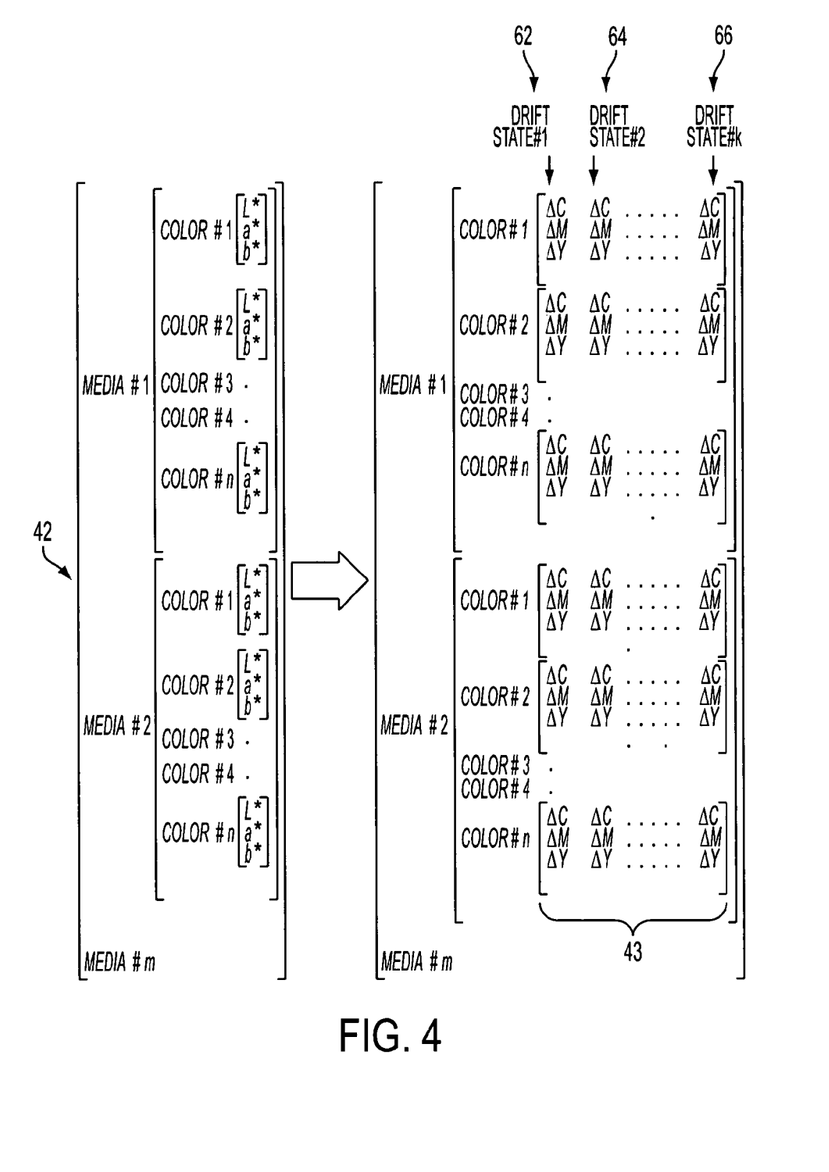
FIG. 4 illustrates a device independent color space to device dependent color space delta LUT according to an exemplary embodiment of this disclosure.

Let $x_i$ represent the column vectors of the inverse LUT 40 of FIG. 3 generated for i=1, 2 . . . , k printer drifts. Let D be a matrix 43 obtained with the mean column removed or the nominal $P^{-1}$ removed from each column containing color and media types. Thus, D will be a delta matrix 43 with M=3*m*n*h rows and k columns corresponding to drift state #1 62, drift state #2 64 up to drift state #k 66, where m=# of media and n=# of color nodes from the data matrix 43 as illustrated in FIG. 4. The principal components are obtained from the data matrix 43 using singular value decomposition (SVD) on the covariance matrix formed by the data matrix D.

$$SVD(DD^t) = U\Sigma V^t \quad (1)$$

In this equation, the M×M matrix U and the k×k matrix V contains the eigen functions (vectors). The matrix Σ is diagonal and contains the square of the rank-ordered eigen values (or singular values). Based on the ratios of the lowest to highest eigen values in Σ matrix, the total number of eigen functions required for approximating the inverse LUT of FIG. 3 can be determined.

Depending on number of media types for a particular printer, m may be as large as 400 or as few as 10 (customer critical media). The number of color nodes in the profile could be as much as 33×33×33=35,937. To reduce the processing requirements of the color management system, the color nodes can be reduced to about 16*16*16=4,096, where an interpolation process increases the node size to 35,937. With regard to half tone screens, in order to account for multiple half tone screens, the original $P^{-1}$ data matrix and subsequent D data matrix must include additional rows of CMY values correlating each half tone screen to the media types and color nodes. According to one exemplary embodiment, the number of half tone screens is limited to four and the number of drift states, i.e. the size of k, is limited to under twenty.

Notably, the color management system and method disclosed is not limited to a specific number of half tone screens or drift states.

Now the LUT shown in FIG. 3 can be approximated by following matrix equation.

$$x = \bar{x} + u\alpha \quad (2)$$

where x is C,M,Y, $\bar{x}$ is the mean value of x (i.e., averaged over the k drifting state in Equation (1) or the nominal inverse LUT, $P^{-1}$nom), and α is the column vector containing coefficients. For example, if the number of eigen functions required for approximating the inverse LUT $P^{-1}$ is 10, then α contains 10 coefficients. These coefficients are updated in the field by performing spot color controls on a few selected spot colors. The methodology associated with the selection of the spot colors can be made using an optimal test patch selection process as disclosed in U.S. patent application Ser. No. 11/314,670.

In effect, the process searches for the best combination of an optimal color set which minimizes the trace of the inverse of the covariance matrix H which is a matrix with reduced elements of the eigen functions formed for various combinations of colors J=tr[(HTH)$^{-1}$] for each combination gives the optimal color set. These colors represent the target values for the spot color control algorithm. According to one exemplary embodiment of this disclosure, the number of colors will be less than 100.

For example, to determine three optimally selected spot color patches out of one hundred color nodes, the following color node selection process can be used.

Step 1: Arbitrarily choose three color nodes from the total set of one hundred color nodes and retrieve the corresponding components from the eigenvectors.

Step 2: Form a matrix H from the components in Step 1 and compute the J value from J−trace (inv(H$^T$H)).

Step 3: Repeat Step 1 and Step 2 for all possible combinations of three nodes out of the color nodes.

Step 4: Select the three color nodes with a minimal J value.

Notably, this method can be extended for any number of optimally selected colors, where this process is repeated for 4, 5, etc. optimal colors and the best one out of this set of optimal colors is selected.

According to another exemplary embodiment of this disclosure, one hundred color nodes or patches are optimally selected from a color node group of 4913 using asymptotic combinatorial optimization algorithm shown below.

Step 1: Order the component of the eigenvectors according to the magnitude of the components. For example, if the eigenvector component for patch #1 is C:0.08, M:−0.1, Y:0.05, K:0.02, then the magnitude sum for patch #1 is 0.25. If patch #2 is C:0.02, M:0.07, Y:0.03, K:0.05, the magnitude sum for patch #2 is 0.17. According to step 1, patch #1 is ordered on top followed by patch #2 in a descending order.

Step 2: Select the one hundred patches with the largest magnitude sum. For example, if the components of eigenvector are ordered in descending order, then select the top one hundred patches. These one hundred patches correspond to the asymptotic solution for minimizing J=trace (inv(H$^T$H)).

Step 3: Using the one hundred patches selected in Step 2 as an initial estimation, further minimize J utilizing other techniques such as GA, Nelder-Mead, etc.

Notably, by optimally selecting color patches or nodes, the amount of processing can be significantly reduced.

Process #3: Automated Update of the Image Output Profile LUTs Using an Interactive Method 16.

Color control is performed iteratively during the printing process at the beginning or at the end of a customer's job. Test pages are prepared, preferably using the colors optimized for the efficient detection. While a test page is printed, the output is measured by an inline color sensor and new CMY values are found using a spot color control algorithm. According to one exemplary embodiment of this disclosure, an automated spot color editor (ASCE) as disclosed in U.S. patent application Ser. No. 11/507,405 is utilized to determine new CMY values. A test target is updated with the CMY values rasterized, printed and measured with the inline sensor. This cycle is repeated for a preset number of iterations. It takes a few seconds to complete this task. After completing the iterations, CMY values are stored and the customer job is printed. These CMY values are used in the least square regression to find the coefficient vector α.

To better describe this process, assume that the number of eigen vectors required to describe the printer drifting is m, and the number of optimal colors for updating using the spot color control is n, let $x_1$ be the CMY difference vector (i.e., the mean in Equation (2) is subtracted) for the n colors after the spot control updating, and $u_1$ is the sub-matrix from the eigen vector matrix u in Equation (2) such that the components of $u_1$ correspond to the n updated colors in u. Notably, the dimension of $u_1$ is (3n)×m and α is then given by $$\alpha = (u_1^T u_1)^{-1} u_1^T x_1 \quad (3)$$

After α is known, the inverse LUT is calculated using principal eigen functions (basis vectors) and the mean inverse LUT, $\bar{x}$, as in equation (2). According to one exemplary embodiment, the final LUTs, L*a*b* to CMYK are constructed by applying GCR/UCR algorithms to transform CMY (i.e., X) to CMYK. In addition, XYZ to CMYK LUTs can be obtained by transforming L*a*b* values to corresponding XYZ values if the input vector of FIG. 3 is designed with XYZ parameter space. Similarly, if the input color space is RGB, then the input vector of FIG. 3 will be replaced by RGB.

The color management system and method described heretofore creates ICC profiles using as many nodes as pre-defined by the user or needed to maintain accuracy. The resulting LUT can then be loaded in a DFE CMM for use on any future images. Moreover, the above described cycle may be repeated for various media or media groups resulting in the vector, X, which can then be separated into multiple CRD(s) or ICC profiles on an as needed basis to maintain optimum color accuracy. Furthermore, the automatic profile generation cycle may be repeated in an automatic transparent fashion to generate the LUT on a preset cadence and inserted in the customer document while RIPPing the job to maintain color accuracy and stability at time t>0.

Figure 5:
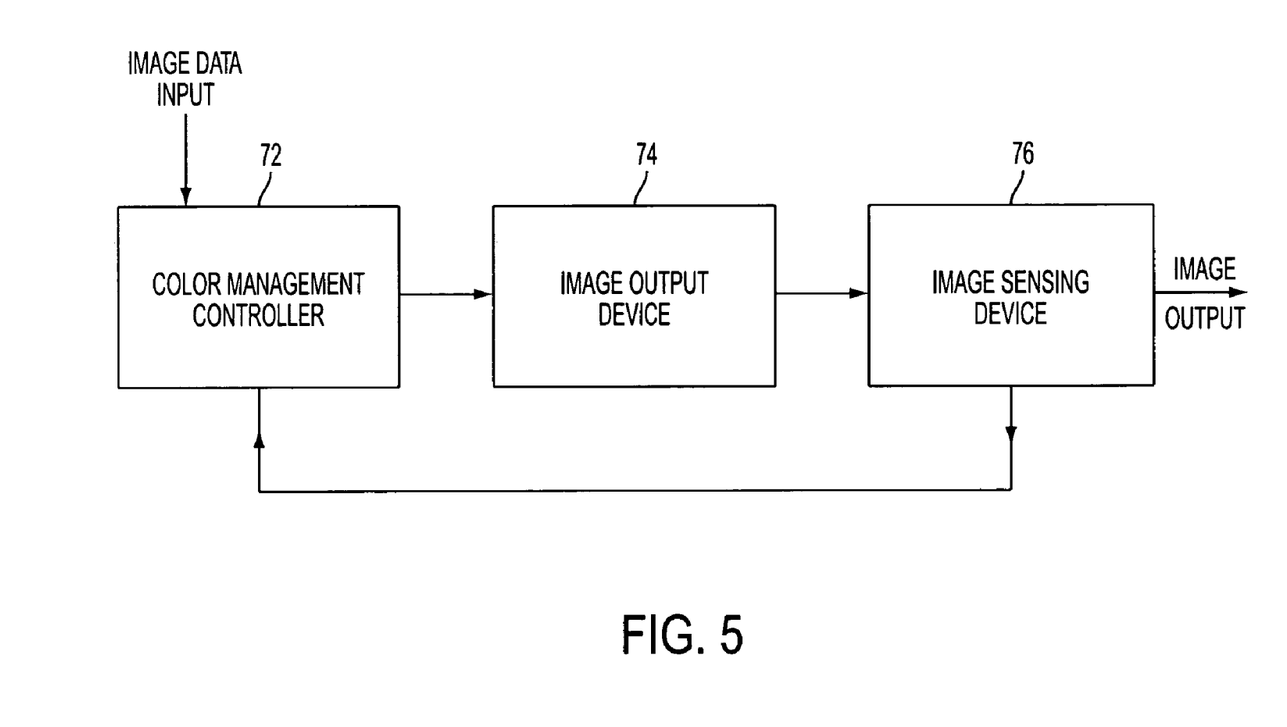
FIG. 5 schematically illustrates a color management system according to an exemplary embodiment of this disclosure.

With reference to FIG. 5, illustrated is a block diagram of a color management system according to an exemplary embodiment of this disclosure.

The color management system comprises a color management controller 72, an image output device 74 and an image sensing device 76. The color management controller 72 stores and executes the color management processes described heretofore and may take the form of a DFE.

Figure 6:
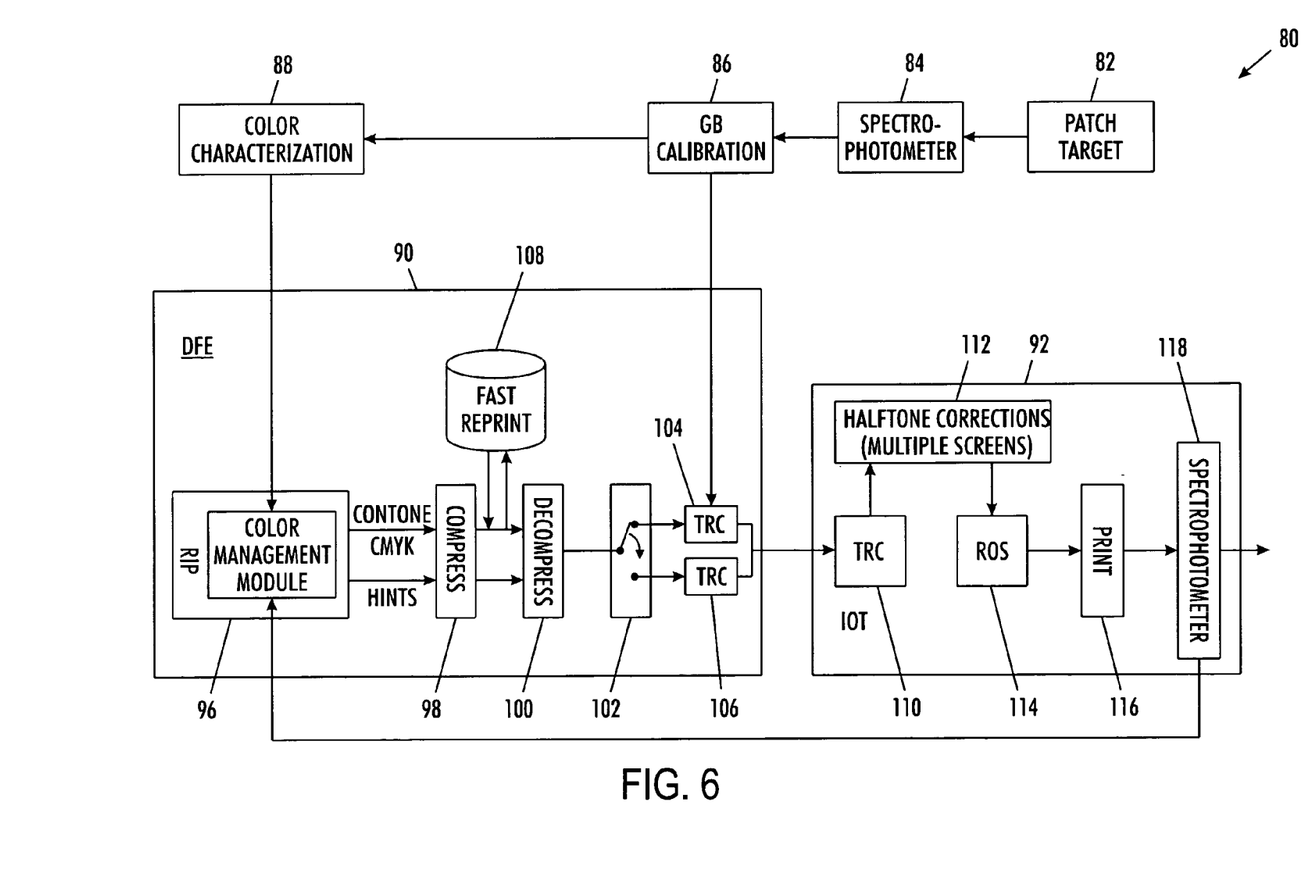
FIG. 6 schematically illustrates a color management system according to another exemplary embodiment of this disclosure.

With reference to FIG. 6, illustrated is a block diagram of a color management system 80 according to an exemplary embodiment of this disclosure. Notably, the system 80 includes an IOT (Image Output Terminal) including a printing device 116, however the system 80 may also include an IOT 92 including a color monitor or display.

The color management system 80 includes a patch target 82, a spectrophotometer 84, a G-B calibration process 86, a color characterization process 88, a DFE 90 (digital front end) and an IOT 92. The DFE 90 includes a RIP 94 (Raster Image Process) integrated with a color management module 96 to produce contone CMYK data as discussed heretofore. In addition, the RIP 94 and integrated color management module 96 provide hints for further processing.

In addition to the RIP 94 process, the DFE 90 includes a data compression process 98, a fast reprint process 108, a data de-compression process 100, a TRC (tone reduction curve), selector 102, a first TRC process 104 and a second TRC process 106.

The IOT 92 includes a TRC process 110, a half tone correction process 112, a ROS (Raster Output Scanner) process 114, a printing process 116 and an in-line spectrophotometer 118 which is operatively connected to the RIP color management module 96 and provides the necessary data feedback to control the color rendering of the printing system as described with reference to FIGS. 1-5.

In operation, the patch target 82, spectrophotometer 84, GB calibration 86 and color characterization 88 are associated with the initial calibration of the DFE/IOT system. This calibration process typically takes place at the IOT manufacturing facility.

During the normal operation of the DFE 90/IOT 92 at the user's and/or customer's location, the color management algorithms discussed heretofore are executed by the DFE 90, specifically the DFE color management module 96.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art.

The following claims are intended only to describe the metes and bounds of some exemplary embodiments of this disclosure. These claims provide additional support for the subject matter disclosed and are not intended to cover the entire breadth of this disclosure.

The invention claimed is:

1. A method for controlling an image output device comprising:
   generating an image output device multidimensional color profile LUT (look-up-table) characterizing a color profile of the image output device for a plurality of drift states associated with the image output device, each drift state associated with an overall change in the performance of the image output device to render a plurality of colors relative to an initial performance of the image output device associated with an initial characterization of the color profile of the image output device;
   generating a set of basis vectors representing the image output device multidimensional color profile LUT;
   storing the set of basis vectors on a controller-usable data carrier;
   determining a current drift state of the image output device; and
   generating an image output device active color profile associated with the current drift state of the image output device to convert image color data for display or printing by the image output device, wherein the image output device active color profile is generated from the set of basis vectors and the current drift state of the image output device.

2. The method for controlling an image output device according to claim 1, further comprising:
   determining the current drift state of the image output device by measuring colorimetric properties associated with one or more predetermined spot colors printed on one or more medias, the spot colors selected based on analyzing the set of basis vectors to determine a set of one or more spot colors which represent the drift state of the image output device.

3. The method of controlling an image output device according to claim 1, further comprising:
   printing color patches on one or more media using one or more half tone screens;
   measuring colorimetric properties associated with the color patches; and
   generating the multidimensional color profile LUT using the colorimetric properties.

4. The method for controlling an image output device according to claim 1, wherein the image output device multidimensional color profile LUT comprises a three dimensional color space LUT for a plurality of colors and the image output device active color profile comprises a three dimensional color space LUT for a plurality of colors.

5. The method for controlling an image output device according to claim 4, wherein the three dimensional color space LUTs comprise a CMY color space LUT.

6. The method for controlling an image output device according to claim 1, wherein the set of basis vectors representing the multidimensional color profile LUT comprises principal component basis vectors.

7. The method for controlling an image output device according to claim 1, further comprising:
   generating the image output device multidimensional color profile LUT for a plurality of media types and drift states associated with the image output device.

8. The method for controlling an image output device according to claim 1, further comprising:
   generating the image output device multidimensional color profile LUT for a plurality of half tone screens and drift states associated with the image output device.

9. A method for controlling an image output device comprising:
   generating an image output device multidimensional color profile LUT characterizing the color profile of the image output device for a plurality of drift states associated with the image output device, each drift state associated with an overall change in the performance of the image output device to render a plurality of colors relative to an initial performance of the image output device associated with an initial characterization of the color profile of the image output device;
   generating a set of principal component basis vectors representing the multidimensional color profile LUT, where $x=\bar{x}+\mu\alpha$ and x represents the image output device multidimensional color profile LUT, $\bar{x}$ represents a mean value of x or nominal device profile LUT, $\mu$ represents an eigenvector matrix and $\alpha$ represents column vector coefficients associated with the plurality of drift states;
   determining and rendering a minimal target color set for measurement by an image sensing device;
   outputting the rendered target color set to the image sensing device to determine the corresponding device dependent color space representations of the target color set;
   using a least square regression technique, determining the coefficient vector $\alpha$ from the target color set device dependent color space representation of the target color set; and
   generating the image output device multidimensional color profile LUT x according to the equation $x=\bar{x}+\mu\alpha$.

10. The method for controlling an image output device according to claim 9, further comprising:
    applying GCR (Gray Component Replacement) and UCR (Under Color Removal) algorithms to the multidimensional color profile LUT x, where x is a CMY color space LUT, and the algorithms generate a CMYK color space LUT.

11. An image output device color control system comprising:
    an image output device comprising an input configured to receive image data for display or printing by the image output device;
    an in-line colorimetric measurement device; and
    a controller operatively connected to the image output device, image output device input and in-line colorimetric measurement device, the controller configured to receive CMYK or RGB and convert to device independent image input data and map the device independent input data to device dependent input data for display or printing by the image output device, wherein the controller comprises a controller-usable data carrier storing instructions that, when executed by the controller cause the controller to perform a method comprising:
(a) accessing a set of principal basis vectors representing a multidimensional color profile LUT associated with the image output device, the multidimensional color profile LUT characterizing the color profile of the image output device for a plurality of drift states, each drift state associated with an overall change in the performance of the image output device to render a plurality of colors relative to an initial performance of the image output device associated with an initial characterization of the color profile of the image output device;
(b) determining a target color set based on the set of principal basis vectors for measurement by the in-line colorimetric measurement device, outputting device dependent color space representations of the target color set to the image output device and rendering the device dependent color spaced representations of the target color set to the image output device;
(c) receiving colorimetric data from the in-line colorimetric measurement device for the rendered target color set, where the colorimetric data is a device independent three dimensional color space representation of the target color set;
(d) calculating a coefficient vector $\alpha$ of the principal basis vector using a least square regression technique; and
(e) generating a device dependent inverse image output device multidimensional color profile LUT based on the coefficient vector $\alpha$ according to an equation $x=\bar{x}+\mu\alpha$, where x represents the device dependent image output device multidimensional color profile LUT, $\bar{x}$ represents a mean value of x or nominal profile LUT, and $\mu$ represents an eigenvector matrix as defined by the principal basis vectors.

12. The image output device color control system according to claim 11, wherein the controller device independent input data is a first three dimensional color space representation of an image for display or printing, and the controller maps the first three dimensional color space representation to a device dependent data represented as a second three dimensional color space.

13. The image output device color control system according to claim 12, wherein the first three dimensional color space is L*a*b* color space representation and the second three dimensional color space is a CMY color space representation.

14. The image output device color control system according to claim 11, wherein the in-line colorimetric measurement device comprises a spectraphotometer.

15. The image output device color control system according to claim 11, wherein the target color set comprises a number of colors selected using a low rank approximation algorithm.

16. The image output device color control system according to claim 11, wherein the principal basis vectors represent an image output device multidimensional color profile LUT characterizing a three dimensional color profile of the image output device for a plurality of drift states and media types.

17. The image output device color control system according to claim 11, wherein the controller performed method step (c) further comprises:
comparing the received colorimetric data from the in-line colorimetric measurement device to a reference data representation of the target color set; and
calibrating the device dependent color space representation of the target color set to substantively provide the colorimetric properties of the target color set.

18. The image output device color control system according to claim 17, wherein step (c) is repeated a predetermined number of times in an iterative manner before proceeding to step (d).

19. The image output device color control system according to claim 11, wherein the controller performed method step (d) further comprises calculating $\alpha$ according to the mathematical relationship $\alpha=(\mu_1^T\mu_1)^{-1}\mu_1^T x_1$, where $\mu_1$ is a sub-matrix from the eigenvector matrix $\mu$ and $x_1$ is a color difference vector for an optimal number, n, of colors associated with the target color set for generating the inverse image output device multidimensional color profile LUT x.

20. A xerographic imaging system comprising:
an image marking device;
an in-line colorimetric measurement device operatively connected to the image marking device;
a controller operatively connected to the image marking device, the controller configured to receive device independent image input data and map the device independent input data to device dependent input data for printing by the image marking device, wherein the controller comprises a controller-usable data carrier storing instructions that, when executed by the controller cause the controller to perform a method comprising:
(a) generating an image marking device multidimensional color profile LUT characterizing a color profile of the image marking device for a plurality of drift states associated with the image marking device, each drift state associated with an overall change in the performance of the image marking device to render a plurality of colors relative to an initial performance of the image marking device associated with an initial characterization of the color profile of the image output device;
(b) generating a set of basis vectors representing the image marking device multidimensional color profile LUT;
(c) storing the set of basis vectors on a controller-usable data carrier;
(d) determining a current drift state of the image marking device; and
(e) generating an image marking device active color profile associated with the current drift state of the image marking device to convert image color data for printing by the image marking device, wherein the image marking device active color profile is generated from the set of basis vectors and the current drift state of the image marking device.

* * * * *